June 8, 1926.

W. J. BEITEL

TIRE MOLD

Filed June 13, 1925

INVENTOR
*William J. Beitel.*
BY
*Albert E. Dulinch*
ATTORNEY

June 8, 1926.  W. J. BEITEL  1,587,577
TIRE MOLD
Filed June 13, 1925    2 Sheets-Sheet 2

INVENTOR
*William J. Beitel.*
BY
ATTORNEY

Patented June 8, 1926.

1,587,577

UNITED STATES PATENT OFFICE.

WILLIAM J. BEITEL, OF BARBERTON, OHIO, ASSIGNOR TO LAMBERT TIRE & RUBBER CO., OF BARBERTON, OHIO, A CORPORATION OF ARIZONA.

TIRE MOLD.

Application filed June 13, 1925. Serial No. 36,983.

My invention relates to certain new and useful improvements in molds for the manufacturing of cellular cushion tires and it particularly has for its object to provide a mold by the use of which more perfectly formed tires are produced. Molds for the production of cushion tires with holes through the same have heretofore been devised in which the mold consists of two-half sections, enclosing between them a forming or molding chamber, and each half mold section is provided with pins, those of one section opposing those of the other section and between them adapted to produce the holes through the tire. In these molds the length of the pins is such that when the molds are fully closed the pins will be in end to end contact. Experience has shown that when the pins are designed to abut end to end, the mold does not always "fill" and trapped air frequently causes imperfect tires. It is therefore an object of the present invention to provide a mold which will eliminate air trapping and make a more perfect tire than formerly.

In carrying out the invention I make the mold pins so that they will not contact end to end when the halves of the mold are completely closed together but a clearance of about one thirty-second of an inch more or less is provided and I further drill the ends of the pins to produce end chambers or drill holes into which excess rubber may be squeezed and air trapped. I may also provide the walls of the mold with shallow grooves at suitable intervals in which air may circulate to prevent the formation of air pockets in the tire.

More specifically the invention resides in those novel features of construction, combination and arrangement of parts, all of which will be first fully described, then be specifically pointed out in the appended claims, reference being had to the accompanying drawings, in which:—

Figure 1:
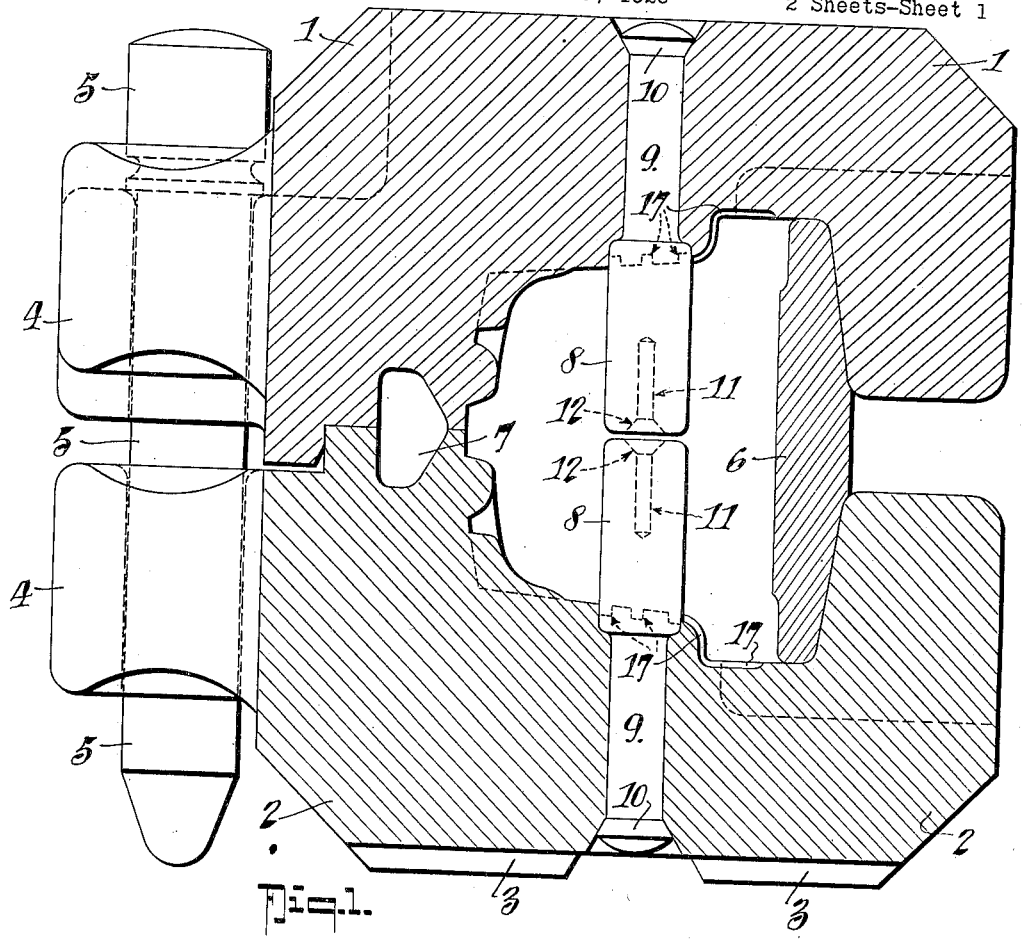
Figure 1 is a cross section of a tire mold embodying my invention.
Figure 3:
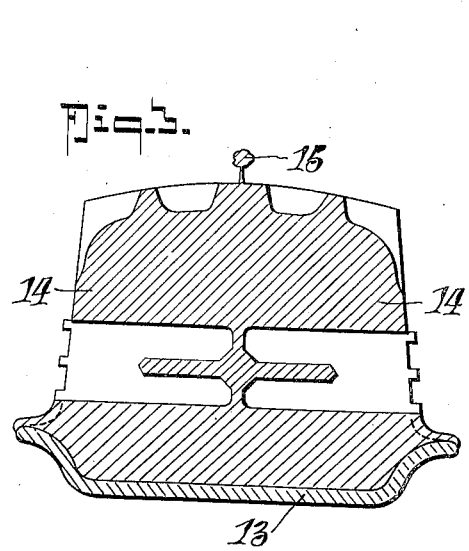
Figure 3 is a cross section of the tire as it comes from the mold after vulcanization and before trimming.
Figure 4:
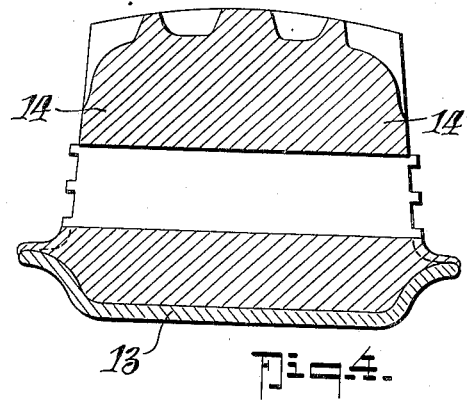
Fig. 4 is a cross section of the finished or trimmed tire.
Figure 2:
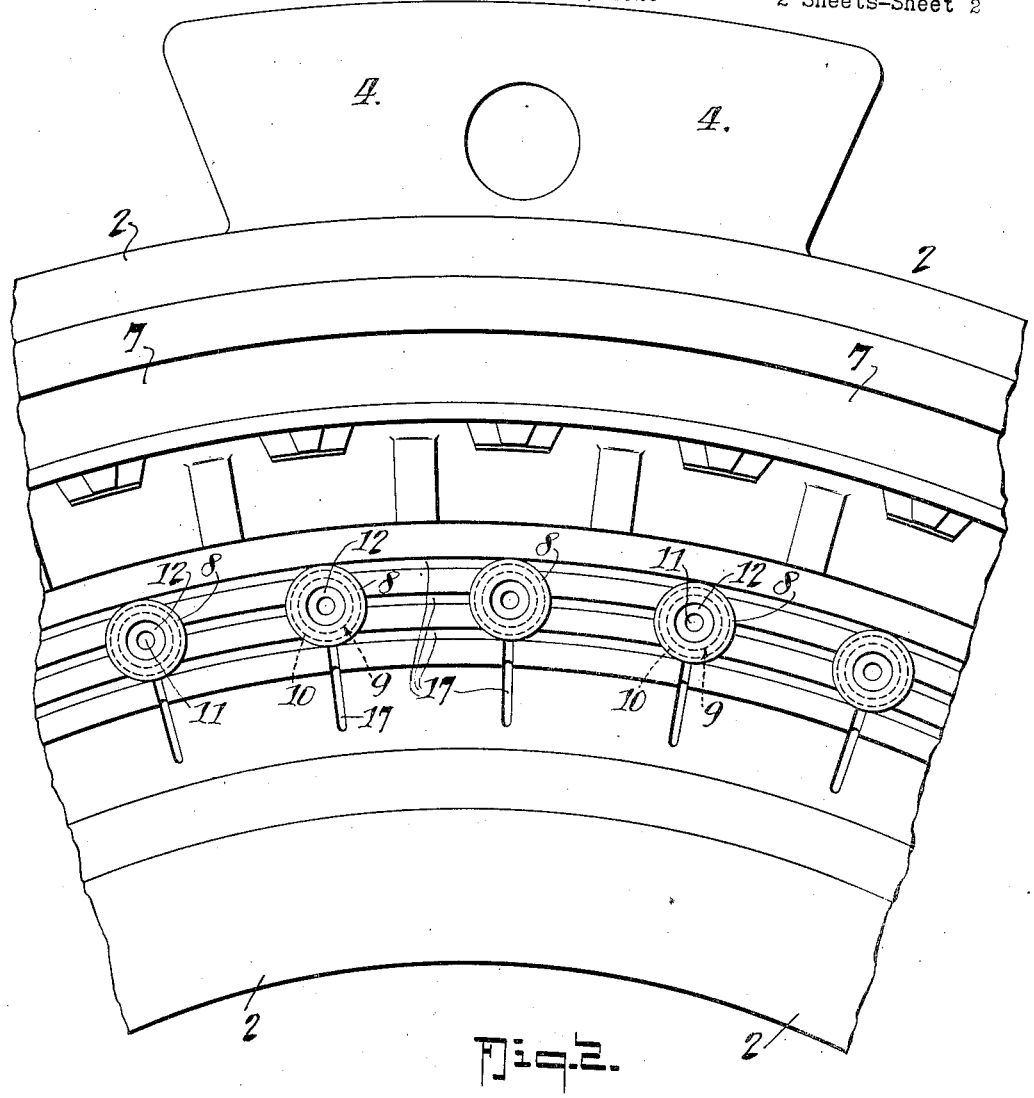
Figure 2 is a detail face view looking from the inside, of a portion of one half showing the air circulating grooves in the mold wall and the recesses or drill holes in the ends of the pins.
Figure 5:
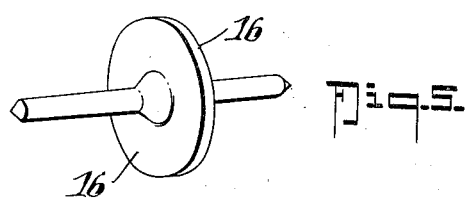
Figure 5 is a detail perspective view of one of the webs cut from the tire to complete the holes through the same.

In the drawings, in which like numerals of reference designate like parts in all the figures, 1 represents a mold half (the top half when viewed in the vulcanizer) and 2 indicates the other half, the latter having its face grooved to provide for steam circulation in the vulcanizer.

4 indicates dowel lugs which receive the pins 5 properly to locate the mold halves on one another. 6 is the base band which is located between the mold halves and against which the rim 13 of the tire rests.

7 designates the tread overflow pocket and 8 indicates the pins secured to the sides of the molds by means of shanks 9 having rivet heads 10. All of the foregoing structure is according to the usual practice, except that the pins 8, instead of being made to extend to the mid plane of the mold and thereby cause contact with the opposing sections, are shortened so as to leave a space between the opposing faces of approximately one thirty-second of an inch (more or less).

In carrying out my invention in addition to shortening the pins I drill the ends to provide recesses or drill holes 11 which may be countersunk at 12 to facilitate the entry of the excess rubber.

13 designates the tire rim and 14 the tire carcass while 15 designates the tread waste and 16 the waste in the holes.

In using my method the tire stock is produced on the rim in the usual way and placed between the opposing sections of the mold. The mold is then forced together to close it and press the pins into the rubber stock, thereby producing the pin holes in the stock and forcing the rubber from the hole locations outwardly to fill the cavities of the mold. By providing the molds with circulation grooves 17 and by providing the shortened pins with their drill holes, I find that there is produced a lesser number of air pockets in the finished tire than under the old practice. In fact air pockets have been practically eliminated.

After the mold has been closed the same is placed in the vulcanizer in the usual way and the usual process of vulcanization is permitted to take place, after which the mold halves are prized apart and the tire removed therefrom. It will be noted on removing the tire from the mold that there will be a fin 15 around the tread formed by excess rubber that has been squeezed into the pockets 7 and there will also be formed a thin web 16 in each hole having projections from each side. These webs are afterwards drilled out by means of tubular drills and the waste 15 cut off by the use of knives, thus leaving the tire in the finished condition.

It has been found that by the use of the shorter pins with the drill hole pockets in their ends, even without the use of the grooves 17 in the mold walls, a great improvement in the quality of the finished tire is obtained and a more perfect tire is formed.

From the foregoing description, taken in connection with the accompanying drawings, it is thought that the complete instruction, operation and advantages of my invention will be clear to those skilled in the art to which it appertains.

What I claim is:

1. In tire molds, the combination of two half-mold members, transverse pins secured to said members, those of one member adapted to oppose those of the other member, said pins being of such length as to leave a relatively small space throughout the opposed ends when the mold-halves are fully closed, substantially as shown and described.

2. In tire molds, the combination of two half-mold members, transverse pins secured to said members, those of one member adapted to oppose those of the other member, said pins being of such length as to leave a relatively small space between the opposing ends when the mold-halves are fully closed, said pins having drill holes in their opposing ends to constitute pockets.

3. A tire mold comprising two half sections adapted to be closed together and enclosing between them a molding chamber, pins secured to each section and projecting into the chamber, said pins of one section adapted to align with those of the other section, the length of said pins being such that when the mold sections are closed together the pins will have their opposing ends spaced apart, said pins having drill holes in their opposing ends paralleling the respective axes of the pins for the purposes described.

4. A tire mold comprising two half sections adapted to be closed together and enclosing between them a molding chamber, pins secured to each section and projecting into the chamber, said pins of one section adapted to align with those of the other section, the length of said pins being such that when the mold sections are closed together the pins will have their opposing ends spaced apart, said pins having drill holes in their opposing ends paralleling the respective axes of the pins, said mold having shallow air circulating grooves in its molding walls.

5. In tire molds, the combination of two half-mold members, transverse pins secured to said members, those of one member adapted to oppose those of the other member, said pins being of such length as to leave a relatively small space throughout the opposed ends when the mold-halves are fully closed, said mold having shallow air circulating grooves in its molding walls, substantially as shown and described.

WILLIAM J. BEITEL.